United States Patent [19] [11] 4,036,655
Yamada et al. [45] July 19, 1977

[54] INORGANIC COMPOSITION

[75] Inventors: Koichi Yamada; Tadanori Hashimoto; Yoshinori Furumi, all of Niihama, Japan

[73] Assignee: Sumitomo Chemical Company, Limited, Osaka, Japan

[21] Appl. No.: 504,964

[22] Filed: Sept. 11, 1974

[30] Foreign Application Priority Data

Sept. 14, 1973 Japan .................................. 48-104061
Sept. 14, 1973 Japan .................................. 48-104063

[51] Int. Cl.$^2$ ............................................. C04B 31/00
[52] U.S. Cl. ......................................... 106/77; 106/74; 106/84; 106/38.3; 106/287 S
[58] Field of Search ................... 106/74, 77, 84, 38.3, 106/287 S

[56] References Cited

U.S. PATENT DOCUMENTS

| 182,760 | 10/1876 | Jacob | 106/84 |
|---|---|---|---|
| 733,573 | 7/1903 | Bevilacqua | 106/84 |
| 1,357,183 | 10/1920 | Phillips et al. | 106/84 |
| 3,178,299 | 8/1965 | Wilborn | 106/74 |
| 3,669,699 | 6/1972 | Doi et al. | 106/74 |

OTHER PUBLICATIONS

Japanese Patent Application Laid–open No. 26,421/72.

Primary Examiner—Winston A. Douglas
Assistant Examiner—John P. Sheehan
Attorney, Agent, or Firm—Stevens, Davis, Miller & Mosher

[57] ABSTRACT

An inorganic composition which is capable of forming a coating film or adherent layer excellent in water resistance, weatherability, heat resistance, chemical resistance, adhesion, surface smoothness, hardness and gloss and which consists essentially of (A) a calcined borate-type mixture obtained by calcining at a temperature of about 300° to about 1,500° C a mixture comprising (i)(a) a borate of a metallic element of Groups II to VIII of the Periodic Table or (i)(b) at least one boric acid compound selected from the group consisting of boric acid and boron oxide and at least one phosphoric acid compound selected from the group consisting of phosphoric acid, phosphorus pentoxide, and metal phosphates and (ii) at least one polyvalent metal compound selected from the group consisting of polyvalent metal oxides, hydroxides, carbonates, phosphates, silicates, sulfates, and nitrates, and (B) a water-soluble silicate.

8 Claims, No Drawings

INORGANIC COMPOSITION

This invention relates to an inorganic composition comprising a water-soluble silicate as a base material. More particularly, this invention relates to an inorganic composition capable of forming a coating film or adherent layer excellent in water resistance, weatherability, heat resistance, chemical resistance, adhesion, surface smoothness, hardness, and gloss, which composition contains as the base material a water-soluble silicate and as the hardener a calcined mixture (hereinafter referred to as calcined borate-type mixture) comprising a borate of a metal of Groups II to VIII of the Periodic Table or a boric acid compound-phosphoric acid compound mixture and a polyvalent metal compound.

Inorganic coatings are well known. Examples of known inorganic coatings include those comprising as the base material a water-soluble silicate and as the hardener a metal borate (Japanese Patent Application Laid-open No. 44,325/73), boric acid (Japanese Patent Publication No. 4,464/72), or a calcined mixture of boric acid, aluminum silicate, and aluminum sulfate (Japanese Patent Application Laid-open No. 26,421/72).

Such conventional hardeners, however, have a disadvantage of yielding hardened coating films inferior particularly in water resistance and chemical resistance. A further disadvantage of such hardeners is too rapid hardening due to their high reactivity, thus resulting in reduced pot life and, hence, limited workability of the coating composition as well as in deterioration of surface smoothness and gloss of the hardened coating. Although there has been proposed a method for improvement of the disadvantage by reducing the amount of the hardener to be used to moderate the hardening reaction, there arises in this case another disadvantage of a marked decrease in water resistance, weatherability, heat resistance, and chemical resistance of the coating film.

The object of this invention is to overcome the aforesaid disadvantages of the inorganic coatings and adhesives. The present inventors made extensive investigations from the said standpoint and as a result have found that a calcined mixture of a borate of a metal of Groups II to VIII of the Periodic Table and a polyvalent metal compound or a calcined mixture of a boric acid compound, phosphoric acid compound and a polyvalent metal compound can act as a hardener capable of affording a prolonged pot life of the coating composition and of developing excellent physical properties of the hardened coating. Based on this finding, the present invention has been accomplished.

According to this invention there is provided an inorganic composition having a prolonged pot life and a low-temperature setting property and being capable of forming a coating film or an adherent layer excellent in water resistance, weatherability, heat resistance, chemical resistance, adhesion, surface smoothness, hardness, and gloss, which composition consists essentially of (A) a calcined borate-type mixture obtained by calcining at a temperature of about 300° to 1,500° C a mixture comprising (i)(a) a borate of a metallic element of Groups II to VIII of the Periodic Table or (i)(b) at least one boric acid compound selected from the group consisting of boric acid and boron oxide and at least one phosphoric acid compound selected from the group consisting of phosphoric acid, phosphorus pentoxide, and metal phosphates and (ii) at least one polyvalent metal compound selected from the group consisting of polyvalent metal oxides, hydroxides, carbonates, phosphates, silicates, sulfates, and nitrates, and (B) a water-soluble silicate, and may be further incorporated with, if necessary, pigments, fillers, and auxiliary agents.

The present hardener, which is a calcined borate-type mixture and one of the components of the present inorganic composition, is used for the prolongation of the pot life of the composition, thus improving workability thereof, to impart a low-temperature setting property to the composition, and to form a coating film or an adherent layer excellent in water resistance, chemical resistance, heat resistance, adhesion, surface smoothness, hardness, and gloss.

One of the constituents of the hardener used in the present inorganic composition is the compound (i)(a) or (i)(b). The borates used as the constituent (i)(a) are those represented by the general formula $xM_2O \cdot yB_2O_3 zH_2O$ (where M is a metal of Groups II to VIII of the Periodic Table, $y/x$ is a positive number equal to or larger than 0.3, and $z$ is 0 or a positive number), including, for example, magnesium borate, calcium borate, barium borate, strontium borate, zinc borate, aluminum borate, lead borate, manganese borate, iron borate, nickel borate, cobalt borate, and chromium borate. These are used each alone or in combinations.

The constituent $(i)(b)$ of the hardener (A) used in the present inorganic composition is a mixture comprising a boric acid compound selected from boric acid, boron oxide, and a mixture of these and at least one phosphoric acid compound selected from phosphoric acid, phosphorus pentoxide, and alkali metal phosphates such as sodium phosphate, potassium phosphate, and lithium phosphate.

The mixtures to be used as $(i)(b)$ are those containing about 5 to 95%, preferably 15 to 85%, by weight of a boric acid compound and about 95 to 5%, preferably 85 to 15%, by weight of a phosphoric acid compound.

The polyvalent metal compound $(ii)$, which is another constituent of the hardener (A), is at least one polyvalent metal compound selected from oxides, hydroxides, carbonates, phosphates, silicates, sulfates, and nitrates of polyvalent metals, including such oxides as aluminum oxide, zirconium oxide, zinc oxide, silicon oxide, magnesium oxide, lead oxide, and calcium oxide; such hydroxides as aluminum hydroxide, zirconium hydroxide, iron hydroxide, magnesium hydroxide, and calcium hydroxide; such carbonates as zinc carbonate, magnesium carbonate, calcium carbonate, iron carbonate, and nickel carbonate; such silicates as aluminum silicate, zirconium silicate, beryllium silicate, magnesium silicate, zinc silicate, barium silicate, and calcium silicate; such phosphates as aluminum phosphate, calcium phosphate, magnesium phosphate, iron phosphate, zirconium phosphate, titanium phosphate, manganese phosphate, and zinc phosphate; such sulfates as aluminum sulfate, calcium sulfate, magnesium sulfate, zinc sulfate, and iron sulfate; such nitrates as aluminum nitrate, calcium nitrate, zinc nitrate, magnesium nitrate, and iron nitrate; and such minerals containing polyvalent metal compounds as kaolin, bentonite, talc, diatomaceous earth, and clay. These are used each alone or in combinations.

The hardener (A) of this invention, that is, a calcined mixture comprising $(i)(a)$ a borate or $(b)$ a mixture of a boric acid compound and a phosphoric acid compound and $(ii)$ a polyvalent metal compound, is prepared by mixing 100 parts by weight of the constituent (i) and 2,000 parts or less, preferably 10 to 1,000 parts, by weight of the polyvalent metal compound, and calcining the mixture after, if necessary, having been pulverized. If the amount of the polyvalent metal compound in the calcined borate-type mixture exceeds 2,000 parts by weight, it becomes impossible to impart adhesiveness, water resistance, and chemical resistance to the coating film or adherent layer.

The calcined borate-type mixture as an effective hardener can be obtained by heating a mixture comprising (i)(a) a borate or (i)(b) a mixture of a boric acid compound and a phosphoric acid compound and (ii) a polyvalent metal compound at a temperature of about 300° to 1,500° C, preferably about 500° to 1,300° C, for about ¼ hour or more, preferably 1 to 10 hours. If the calcining temperature is below about 300° C, the inorganic composition becomes inferior in pot life and forms a coating film or an adherent layer inferior in water resistance, chemical resistance, and surface smoothness, while if the calcining temperature exceeds 1,500° C, performance of the hardener is undesirably deteriorated.

In preparing the inorganic composition, it is desirable that the calcined borate-type mixture be ground to a particle size of 50 μ or less by known apparatuses such as ball mill, colloid mill, or sand mill.

A known hardener, which is only boric acid or a metal borate, is too high in activity. Another known hardener, which is a calcined mixture comprising boric acid, aluminum silicate, and aluminum sulfate, is also high in activity due probably to the presence of free boric acid and is inferior in pot life, low-temperature setting property, and in characteristics of the coating film, particularly water resistance, due presumably to solubility of the free boric acid in water, as compared with the coating film or adherent layer obtained from the inorganic composition containing the present hardener.

The water-soluble silicates, which constitute another component of the present inorganic composition, to be used in this invention can be alkali metal silicates such as lithium silicate, potassium silicate, and sodium silicate; ammonium silicate; and said alkali metal silicates modified with metallic compounds reactive thereto, such as fluorides, oxides, hydroxides, and silicates. These silicates are used each alone or in combinations. Particularly preferred silicates are potassium silicate and sodium silicate.

The modified water-soluble silicate can be prepared by the methods disclosed in, for example, Japanese Patent Application Laid-open Nos. 20,229/72, and 12,835/73.

The inorganic composition of this invention can be prepared by mixing the aforesaid calcined borate-type mixture with an aqueous solution of the water-soluble silicate and, if necessary, may be further diluted with water. In the present inorganic composition, the mixing ratio between the calcined borate-type mixture and the water-soluble silicate is 2 to 1,000 parts, preferably 5 to 500 parts, by weight of the former to 100 parts by weight in terms of solids content of the latter. If the amount of the calcined borate-type mixture falls below 2 parts by weight, the coating film or the adherent layer can no longer be imparted with proper water resistance, weatherability, heat resistance, and hardness, while if the amount exceeds 1,000 parts by weight, the pot life is markedly reduced and the coating film is deteriorated in surface evenness and gloss.

Depending upon the type of calcined borate-type mixture and the intended use of the composition, the mixing ratio between the calcined borate-type mixture and the water-soluble silicate can be suitably selected within the above-said range.

The pigments which are added, if necessary, to the present inorganic composition include titanium oxide, chromium oxide, cobalt oxide, chromates, white lead, red lead, chrome yellow, zinc oxide, litharge, ultramarine, molybdenum red, red iron oxide, oxide yellow, cobalt blue, and iron black. Pigments are used generally in such amounts that are not harmful to the performance of the coating film or adherent layer.

Examples of fillers to be used are fine granular refractories such as aluminum hydroxide, alumina, silica, mica, boron nitride, zircon, mullite, kyanite, silimanite, silicon carbide, clay, and graphite; and powdered metals such as stainless steel, aluminum, nickel, and chromium.

Further, the composition can be incorporated with auxiliary agents such as alumina sol, alumina gel, silica sol, and silica gel in an amount below about 80%, particularly 5 to 50%, by weight based on the solids contained in the composition. Such auxiliary agents are preferred because of their advantageous effect on the low-temperature setting property of the composition.

Application of the present inorganic composition on the substrate material can be effected by known coating procedures such as spraying, brushing, roll coating, and dipping. The applied inorganic composition can be hardened either by standing at room temperature or by heating generally at a temperature of about 80° to 250° C for 10 to 60 minutes, forming a coating film or an adherent layer excellent in water resistance, weatherability, heat resistance, chemical resistance, adhesion, surface smoothness, hardness, and gloss.

The present inorganic composition has very good adhesiveness and can be utilized as a coating or adhesive composition for a variety of substrate materials such as, for example, wooden materials, slate, calcium silicate board, gypsum board, cured foam concrete, porcelain, inorganic materials such as paving materials, metal sheets such as aluminum sheet, iron sheet, and stainless steel sheet.

In Examples given below, physical properties of the coating film were measured by the following methods.

Hardness: By pencil scratch test according to JIS K 5400.

Water resistance: Appearance of the coating film was inspected after having been immersed in boiling water for 2 hours.

Weatherability: Measured by means of Weather-O-meter according to JIS K 5400.

Acid resistance: Appearance of the coating film was inspected after having been immersed in aqueous hydrochloric acid (3% by weight).

Alkali resistance: Appearance of the coating film was inspected after having been immersed in an aqueous sodium hydroxide solution (3% by weight).

Adhesion: By cross cut test (A checkerwise pattern with 100 checks, each 1 mm square, was cut by means of a cutter in the coating film in an area covering 10 mm × 10 mm. The peel test was conducted by use of a piece of adhesive cellophane tape and the number of checks where the film remained on the panel was counted.)

Heat resistance: Appearance of the coating film was inspected after having been kept in an electric furnace at 500° C for one hour.

Surface smoothness and gloss: Visually inspected.

Pot life: The time elased until hardening occurred was measured when inorganic composition had been kept at 25° C.

The invention is illustrated below in further detail with reference to Examples, but the invention is not limited thereto. In Examples all parts and percentages are by weight.

EXAMPLE 1

1. Preparation of hardener:

Various hardeners were prepared by calcining mixtures of metal borates and polyvalent metal compounds under the conditions shown in Table 1.

Table 1

| Hardner designation | | Composition of hardener | (Mixing ratio) | Condition of calcination Temp. | Time (hour) |
|---|---|---|---|---|---|
| | A | Aluminum borate-magnesium oxide | (10:3) | 1000 | 1 |
| | B | Aluminum borate-calcium silicate | (10:5) | 500 | 1 |
| | C | Aluminum borate-aluminum dihydrogen phosphate | (10:10) | 1000 | 5 |
| | D | Calcium borate-aluminum hydroxide | (10:20) | 500 | 3 |
| Hardener of this invention | E | Calcium borate-kaolin | (10:5) | 1000 | 1 |
| | F | Calcium borate-calcium phosphate | (10:10) | 1000 | 2 |
| | G | Lead borate-lead oxide | (10:5) | 400 | 5 |
| | H | Zinc borate-magnesium hydroxide | (10:30) | 700 | 5 |
| | I | Aluminum borate-zinc carbonate | (10:80) | 1000 | 2 |
| | J | Iron borate-calcium sulfate | (10:5) | 1000 | 1 |
| | K | Magnesium borate-iron nitrate | (10:3) | 1200 | 2 |
| Hardener of this invention | L | Manganese borate-zirconium phosphate | (10:10) | 1000 | 2 |
| | M | Chromium borate-titanium phosphate-aluminum silicate | (10:10:10) | 700 | 5 |
| | N | Calcium borate-aluminum dihydrogen phosphate-calcium silicate | (10:10:10) | 1000 | 2 |
| | X | Lead borate | | 500 | 5 |
| Comparative Example | Y | Calcium borate-kaolin | (10:5) | Non-calcined Mixture | |
| | Z | Boric acid-aluminum silicate-aluminum sulfate | (10:10:7) | 100 | 10 |

Note: Mixing ratio is by weight.

2. Preparation of inorganic composition:

To each of the hardeners prepared as mentioned above, were added a water-soluble alkali metal silicate, pigment, filler, and auxiliary, agent in a ratio as shown in Table 2, then uniformly ground (< 10 μ) and mixed in a ball mill to obtain an inorganic composition.

Table 2

| Inorganic composition No. | Hardener Designation | Amount used (parts) | Water-soluble alkali metal silicate Type | Amount used (parts) | Pigment type | Amount used (parts) | Other ingredient Type | Amount used (parts) |
|---|---|---|---|---|---|---|---|---|
| 1 | A | 100 | JIS No. 3 water glass | 100 | | 30 | Cr oxide | 40 | Alumina sol (10% solids) | 40 |
| 2 | D | 250 | " | 100 | | | | | Powdered stainless steel | 70 |
| 3 | G | 160 | " | 100 | | | Red oxide | 10 | | |
| 4 | B | 60 | Potassium silicate, SiO₂/K₂O = 4 (mole ratio), 40% solids | 100 | | 20 | Ultramarine | 30 | Alumina sol (10% solids) | 50 |
| 5 | C | 20 | JIS No. 3 water glass | 100 | | 40 | Ti oxide | 10 | Zircon | 50 |
| The present inorganic composition | 6 | E | 120 | " | 100 | | 50 | | | | |
| 7 | F | 140 | JIS No. 1 water glass | 100 | | 30 | Ti oxide | 20 | | |
| 8 | H | 40 | Modified water glass* | 100 | | 20 | Zn oxide | 30 | | |
| 9 | I | 130 | JIS No. 3 water glass | 100 | | 10 | Cr oxide | 40 | Alumina sol (10% solids) | 40 |
| 10 | J | 70 | JIS No. 1 water glass Potassium silicate, | 100 | | | | | | |
| 11 | K | 100 | SiO₂/K₂O = 4 (mole ratio), 40% solids | 100 | | 20 | Zn oxide | 10 | Silica sol (40% solids) | 30 |
| | | | | | | 50 | | | Aluminum oxide | 30 |
| 12 | L | 70 | JIS No. 1 water glass | 100 | | 20 | Ti oxide | 20 | | |
| 13 | M | 60 | JIS No. 3 water glass | 100 | | 30 | | | | |
| 14 | N | 110 | " | 100 | | 20 | | | | |
| 15 | A | 140 | " | 100 | | | | | | |
| Comparative Example | 16 | X | 50 | JIS No. 3 water glass | 100 | | | | | | |
| 17 | Y | 20 | " | 100 | | | | | | |
| 18 | Z | 10 | JIS No. 1 water glass | 100 | | | | | | |

Note: 100 Parts of No. 1 water glass was admixed with 10 parts of aluminum silicate and heat-treated at 100° C for 5 hours.

3. Formation of coating film and evaluation thereof:

Coating films, 20 μ in thickness, were formed by spraying various inorganic compositions shown in Table 2 onto a sheet of slate and maintaining the coating under hardening conditions shown in Table 3.

The coating films thus obtained were subjected to various coating tests. The physical properties of the coating films were as shown in Table 3.

Table 3

| Inorganic composition No. | Coating film of this invention | | | | | | | | | |
|---|---|---|---|---|---|---|---|---|---|---|
| | 1 | 2 | 3 | 4 | 5 | 6 | 7 | 8 | 9 | 10 |
| Item of test Hardening Temp. | | | | | | | | | | |

Table 3-continued

| Inorganic composition No. | 1 | 2 | 3 | 4 | Coating film of this invention 5 | 6 | 7 | 8 | 9 | 10 |
|---|---|---|---|---|---|---|---|---|---|---|
| (° C) | 150 | 150 | 130 | 100 | 30 | 30 | 20 | 25 | 150 | 130 |
| conditions Time (hour) | 1 | 1 | 1 | 1 | 50 | 100 | 50 | 72 | 1 | 1 |
| Hardness | >9H | >9H | >9H | >9H | >9H | >9H | >9H | >9H | >9H | >9H |
| Water resistance | | | | | No change | | | | | |
| Weatherability | | No change | | | slight chalking | | No change | | | |
| Acid resistance | | | | | No change | | | | | |
| Alkali resistance | | | | | No change | | | | | |
| Adhesion | 100/100 | 100/100 | 100/100 | 100/100 | 100/100 | 100/100 | 100/100 | 100/100 | 100/100 | 100/100 |
| Heat resistance | | | | | No change | | | | | |
| Surface smoothness | | | | | Good | | | | | |
| Gloss | | | | | Good | | | | | |
| Pot life (hour) | 4 | 4 | 4 | 3 | 3 | 3 | 3 | 3 | 4 | 4 |

| | Coating film of this invention | | | | | Comparative Examples | | |
|---|---|---|---|---|---|---|---|---|
| | 11 | 12 | 13 | 14 | 15 | 16 | 17 | 18 |
| | 100 | 100 | 80 | 30 | 150 | 150 | 150 | 150 |
| | 1 | 1 | 2 | 50 | 1 | 1 | 1 | 1 |
| | >9H | >9H | >9H | >9H | >9H | >9H | 6H | 9H |
| | No change | | | Slight softening | No change | Slight softening | Dissolved | Slight softening |
| | No change | | | Slight chalking | No change | Slight chalking | Peeling | Slight chalking |
| | | | | No change | | Slightly dissolved | Dissolved | Slightly dissolved |
| | | | | No change | | Slightly dissolved | Dissolved | Slightly dissolved |
| | 100/100 | 100/100 | 100/100 | 100/100 | 100/100 | 100/100 | 100/100 | 100/100 |
| | | | | No change | | Slight blistering | Blistering | Blistering |
| | | | | Good | | Good | Poor | Good |
| | | | | Good | | Good | Poor | Good |
| | 4 | 3 | 3 | 3 | 4 | 0.5 | 0.2 | 0.5 |

It is apparent from Table 3 that the present inorganic compositions (Nos. 1 to 15) containing as a hardener component a calcined mixture of a borate of a metal of Groups II to VIII of the Periodic Table and a polyvalent metal compound are superior in physical properties of the coating film, compared with an inorganic composition containing a known hardener.

EXAMPLE 2

Mixtures of boric acid compounds, phosphoric acid compounds, and polyvalent metal compounds shown in Table 4 were calcined under the conditions shown in Table to prepare hardeners.

Table 4

| Hardener designation | | Boric acid compound | | Phosphoric acid compound | | Polyvalent metal compound | | Calcination condition | |
|---|---|---|---|---|---|---|---|---|---|
| | | Type | Amount used (parts) | Type | Amount used (parts) | Type | Amount used (parts) | Temp. (°C) | Time (hour) |
| | A | Boric acid | 34 | Phosphoric acid (85%) | 66 | Al hydroxide | 70 | 500 | 5 |
| | B | " | 28 | " | 72 | Al silicate | 100 | 600 | 6 |
| Hardener of this invention | C | " | 40 | Phosphorus pentoxide | 60 | Kaolin | 200 | 800 | 8 |
| | D | " | 30 | Al phosphate | 70 | Zr oxide | 80 | 800 | 4 |
| | E | " | 70 | Ca phosphate | 30 | Mg silicate | 400 | 500 | 8 |
| | F | " | 20 | Zr phosphate | 80 | Ca sulfate | 20 | 1000 | 6 |
| | G | " | 30 | Na phosphate | 70 | Fe nitrate | 100 | 1000 | 5 |
| | H | Boron oxide | 60 | Fe phosphate | 40 | Mg carbonate | 300 | 1000 | 2 |
| Hardener of this invention | I | " | 50 | Pb phosphate | 50 | Pb oxide | 200 | 700 | 6 |
| | J | " | 40 | Zn phosphate | 60 | Talc | 500 | 800 | 5 |
| | K | " | 30 | Al phosphate | 70 | Al hydroxide | 200 | 500 | 5 |
| | W | Boric acid | 34 | Phosphoric acid (85%) | 66 | — | | 1000 | 5 |
| | X | Boron oxide | 40 | Ca phosphate | 60 | — | | 800 | 5 |
| Comparative Example | Y | Boric acid | 100 | | — | Al silicate Al sulfate | 100 70 | 100 | 10 |
| | Z | — | | Phosphoric acid (85%) AlH$_2$PO$_3$ | 43 | Zn oxide Ca chloride Ca silicate | 57 40 28 | 300 | 2 |

2. Preparation of inorganic composition:

To each of the hardeners prepared as mentioned above, were added a water-soluble alkali metal silicate, pigment, filler, and auxilliary agent in a ratio shown in Table 5, then uniformly ground and mixed in a ball mill to obtain an inorganic composition.

Table 5

| Inorganic composition No. | Hardener | | Water-soluble alkali metal silicate | |
|---|---|---|---|---|
| | Designation | Amount used (parts) | Type | Amount used (parts) |

Table 5-continued

|  |  |  |  |  |  |
|---|---|---|---|---|---|
| Inorganic composition of this invention | 1 | A | 50 | JIS No. 1 water glass | 100 |
|  | 2 | B | 20 | Modified water glass* | 100 |
|  | 3 | C | 70 | JIS No. 3 water glass | 100 |
|  | 4 | D | 50 | JIS No. 1 water glass | 100 |
|  | 5 | E | 200 | K silicate, SiO$_2$/K$_2$O = 4 (mole ratio), 40% solids | 100 |
|  | 6 | F | 150 | JIS No. 1 water glass | 100 |
|  | 7 | G | 40 | JIS No. 3 water glass | 100 |
|  | 8 | H | 130 | " | 100 |
|  | 9 | I | 100 | K silicate, SiO$_2$/K$_2$O = 4 (mole ratio), 40% solids | 100 |
| Comparative Example | 10 | J | 230 | JIS No. 1 water glass | 100 |
|  | 11 | K | 180 | JIS No. 3 water glass | 100 |
|  | 12 | W | 12 | JIS No. 1 water glass | 100 |
|  | 13 | X | 40 | JIS No. 3 water glass | 100 |
|  | 14 | Y | 10 | JIS No. 1 water glass | 100 |
|  | 15 | Z | 120 | " | 100 |

| Amount of water used (parts) | Pigment Type | Amount used (parts) | Other ingredient Type | Amount used (parts) |
|---|---|---|---|---|
| 20 | Ti oxide | 10 | Aluminum oxide | 40 |
| 10 |  |  |  |  |
| 30 |  |  | Silica sol (40% solids) | 30 |
| 40 | Cr oxide | 20 | Alumina sol (10% solids) | 50 |
| 20 |  |  | Alumina sol (10% solids) | 50 |
| 50 | Zn oxide | 30 | Zircon | 50 |
| 50 | Red oxide | 50 |  |  |
| 30 |  |  |  |  |
| 30 |  |  | Alumina sol (10% solids) | 40 |
| 40 |  |  |  |  |
| 20 | Ti oxide | 10 |  |  |
| 20 |  |  |  |  |
| 70 | Ti oxide | 20 |  |  |

Note: 100 parts of No. 1 water glass was admixed with 10 parts of aluminum silicate and heat-treated at 100°C for 5 hours.

3. Formation of coating film and evaluation thereof.

Coating films, 20 μ in thickness, were formed by spraying various inorganic compositions shown in Table 5 onto a sheet of slate and maintaining the coating under hardening conditions shown in Table 6.

The coating films thus obtained were undergone various coating tests. The physical properties of the coating films were as shown in Table 6.

Table 6

| Inorganic composition No. | Coating film of this invention | | | | | | | | |
|---|---|---|---|---|---|---|---|---|---|
|  | 1 | 2 | 3 | 4 | 5 | 6 | 7 | 8 | 9 |
| Item of test |  |  |  |  |  |  |  |  |  |
| Hardening Temp. (° C) | 30 | 25 | 100 | 100 | 80 | 30 | 100 | 100 | 30 |
| conditions Time (hour) | 72 | 72 | 1 | 1 | 2 | 100 | 1 | 1 | 72 |
| Hardness | >9H | >9H | >9H | >9H | >9H | >9H | >9h | >9H | >9H |
| Water resistance |  |  | No change |  |  |  |  |  |  |
| Weatherability | No change | Slight chalking |  |  |  | No change |  |  |  |
| Acid resistance |  |  | No change |  |  |  |  |  |  |
| Alkali resistance |  |  | No change |  |  |  |  |  |  |
| Adhesion | 100/100 | 100/100 | 100/100 | 100/100 | 100/100 | 100/100 | 100/100 | 100/100 | 100/100 |
| Heat resistance |  |  | No change |  |  |  |  |  |  |
| Surface smoothness |  |  | Good |  |  |  |  |  |  |
| Gloss |  |  | Good |  |  |  |  |  |  |

| Coating film of this invention | | | Comparative Examples | | | |
|---|---|---|---|---|---|---|
| 10 | 11 | 12 | 13 | 14 | 15 | |
| 30 | 100 | 30 | 30 | 30 | 30 | |
| 48 | 1 | 100 | 100 | 120 | 120 | |
| >9H | >9H | 8H | 9H | 9H | 9H | |
| Slight softening | No change | Dissolved | Dissolved | Softening | Slight Softening | |
| Slight chalking | No change | Chalking | Chalking | Chalking | Slight chalking | |
| No change |  | Dissolved | Dissolved | Softening | Slight softening | |
| Slight softening | No change | Dissolved | Dissolved | Dissolved | Softening | |
| 100/100 | 100/100 | 100/100 | 100/100 | 100/100 | 100/100 | |
| No change |  | Partial blistering | Partial blistering | Partial blistering | No change | |
| Good |  | Good | Good | Good | Good | |

| Table 6-continued | | | | |
|---|---|---|---|---|
| Good | Good | Good | Good | Good |

It is apparent from Table 6 that the present inorganic compositions (Nos. 1 to 11) containing as a hardener a calcined mixture of a boric acid compound, a phosphoric acid compound, and a polyvalent metal compound are superior in physical properties of the coating film compared with a known inorganic composition.

What is claimed is:

1. An inorganic composition which consists essentially of
    A. 2 to 1,000 parts by weight of a calcined polyvalent metal-borate-type mixture obtained by calcining at a temperature of about 300°C to about 1,500°C a mixture comprising 100 parts by weight of (i) (a) a borate of a metal of Groups II to VIII of the Periodic Table or (i) (b) at least one boric acid compound selected from the group consisting of boric acid compound selected from the group consisting of boric acid and boric oxide and at least one phosphoric acid compound selected from the group consisting of phosphoric acid, phosphorus pentoxide and a metal phosphate selected from the group consisting of sodium phosphate, potassium phosphate, and lithium phosphate and (ii) not more than 2,000 parts by weight of at least one polyvalent metal compound selected from the group consisting of polyvalent metal oxides, hydroxides, carbonates, phosphates, silicates, sulfates, and nitrates and
    B. 100 parts (as solid matter) by weight of water-soluble silicates.

2. An inorganic composition according to claim 1 wherein said borate has the general formula $xM_2O.yB_2O_3.zH_2O$ wherein M is a metal selected from the group consisting of the Group II to VIII metals of the Period Table, Y/X is a positive number of 0.3 or more and Z is 0 or a positive number.

3. An inorganic composition according to claim 1, wherein the mixture used as (i) (b) is a mixture consisting of about 5–95% by weight of boric acid compound and about 95–5% by weight, of phosphoric acid compound.

4. An inorganic composition according to claim 1, wherein the mixing ratio of the component (A) and the component (B) is 5 to 500 parts, by weight of (A) to 100 parts by weight in terms of solid content of (B).

5. An inorganic composition according to claim 1, wherein the polyvalent metal compounds are selected from the group consisting of aluminum oxide, zirconium oxide, zinc oxide, silicon oxide, magnesium oxide, lead oxide, and calcium oxide; aluminum hydroxide, zirconium hydroxide, iron hydroxide, magnesium hydroxide, and calcium hydroxide; zinc carbonate, magnesium carbonate, calcium carbonate, iron carbonate, and nickel carbonate; aluminum silicate, zirconium silicate, beryllium silicate, magnesium silicate, zinc silicate, barium silicate, and calcium silicate; aluminum phosphate, calcium phosphate, magnesium phosphate, iron phosphate, zirconium phosphate, titanium phosphate, manganese phosphate, and zinc phosphate; aluminum sulfate, calcium sulfate, magnesium sulfate, zinc sulfate, and iron sulfate; aluminum nitrate, calcium nitrate, zinc nitrate, magnesium nitrate, and iron nitrate; and kaolin, bentonite, talc, diatomaceous earth, and clay.

6. An inorganic composition according to claim 1, wherein the water soluble silicate is an alkali metal silicate or ammonium silicate.

7. An inorganic composition according to claim 6, wherein the alkali metal silicate is lithium silicate, potassium silicate or sodium silicate.

8. An inorganic composition according to claim 1, wherein the water soluble silicate is an alkali metal silicate modified with a metallic compound reactive thereto selected from the group consisting of flourides, oxides, hydroxides, and silicates.

* * * * *